United States Patent Office 3,450,755
Patented June 17, 1969

3,450,755
PERFLUOROALKYL SULFONAMIDES AND CARBOXAMIDES
Arthur H. Ahlbrecht, Dellwood, Minn., assignor to Minnesota Mining and Manufacturing Company, St. Paul, Minn., a corporation of Delaware
No Drawing. Continuation-in-part of application Ser. No. 350,563, Mar. 9, 1964. This application Feb. 23, 1967, Ser. No. 617,796
Int. Cl. C07c *143/72;* C09d *3/48*
U.S. Cl. 260—556                       2 Claims

ABSTRACT OF THE DISCLOSURE

N-alkyl, N-omega(primary)aminoalkyl perfluoroalkanesulfonamides and -carbonamides are provided and are useful, inter alia, as epoxy resin curing agents to form coatings.

---

This application is a continuation-in-part of my copending application Ser. No. 350,563 filed Mar. 9, 1964, now abandoned.

This invention relates to new primary amines and particularly to N-alkyl, N-omega-aminoalkyl perfluoroalkanesulfonamides and -carbonamides.

Although fluorocarbons are known having acidic, neutral and basic functions, e.g. carboxylic acids as described, for example, in Brown, U.S. Patent 2,809,090 and sulfonic acids as described in Brice and Trott, U.S. Patent 2,732,398, alcohols as described in Brown, U.S. Patent 2,809,990; Ahlbrecht and Brown, U.S. Patent 2,803,656; tertiary amine groups, as described in Brown, U.S. Patent 2,759,019 and primary amines as described in Husted and Ahlbrecht, U.S. Patent 2,691,043 it appears that fluorocarbons having the basic properties and the active hydrogen atoms of aliphatic primary amine groups separated from the perfluoroalkyl group by a chain of four or more atoms have not heretofore been readily available.

It is one object of this invention to provide primary amines having fluorocarbon chains.

It is a furthe object of this invention to provide fluorocarbon terminated amine curing agents for epoxy resins.

Additional objects will become apparent from the disclosure herein.

In accordance with these and other objects of the invention it has been found that fluorocarbon terminated primary amines of the formula

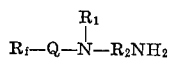

wherein $R_f$ is perfluoroalkyl of 1 to 18 carbon atoms, $R_1$ is saturated alkyl of 1 to about 6 carbon atoms, $R_2$ is bridging alkylene of 2 to 13 carbon atoms and Q is $SO_2$ or CO are reactive with epoxy resins and isocyanates to give polymers possessing fluorinated groups. They may be converted to di-amines by reaction with cyanuric chloride followed by conversion of two further chlorines to amine groups. The compounds of the invention are thus valuable intermediates.

The novel primary amines of the invention may be prepared by several methods. Some procedures are widely applicable and others are of more limited applicability as will become apparent.

The compounds of the invention may be prepared (Gabriel synthesis) from the N-alkyl perfluoroalkane-sulfonamide or -carbonamide by condensation of the alkali metal salt with N-(omega-haloalkyl) phthalimides followed by cleavage, for example, with hydrazine. Another useful method is the ammonolysis of arenesulfonate esters of carbinols corresponding to the desired primary amine.

The amines of the invention react with the reactive groups of epoxy resins, isocyanates and the like in forming coatings for conferring oleophobicity on surfaces of textiles, plastics, leather, metal, glass and ceramics and further form polymerizable acrylamides. They are thus valuable intermediates in treatments of surfaces where alteration of properties is desired.

The following examples further illustrate compounds of the invention.

EXAMPLE 1

The sodium salt of N-ethyl perfluorooctanesulfonamide is prepared from the amide and sodium hydroxide in acetone solution and brought to dryness. A vessel equipped for reflux and stirring is charged with 252 g. of the dry sodium salt, 127 g. of N-(β-bromoethyl)phthalimide, 10 g. of sodium carbonate, 10 g. of potassium iodide and 500 ml. of acetone. The resulting solution is stirred and refluxed for 48 hours, cooled and filtered to remove the precipitate of sodium bromide. The filtrate is evaporated and finally distilled under reduced pressure: N-(N'-ethyl-β-perfluorooctanesulfonamidoethyl)phthalimide distills at 180° to 185° C. at 0.3 mm. Hg pressure.

A solution of 104 g. of the above phthalimide and 50 g. of 85 percent hydrazine hydrate in 100 g. of ethanol is refluxed for four hours and cooled. The precipitate of phthalazine is removed by filtration and the filtrate is evaporated and the residue distilled. The product is 56 g. of N-ethyl-N-β-aminoethyl perfluorooctanesulfonamide boiling at 120° to 125° C. at 0.25 mm. Hg pressure.

Calculated for $C_{12}F_{17}H_{11}SO_2N_2$: 4.91% N. Found: 4.78% N.

The hydrochloride is prepared by evaporation of an ethanolic solution of the above amine and hydrochloric acid.

Calculated for $C_{12}F_{17}H_{12}N_2Cl$: 5.86% Cl; 4.63% N. Found: 6.25% Cl; 4.66% N.

The amine is reacted with acrylyl chloride in ether and N-ethyl N-β-acrylamidoethyl perfluorooctanesulfonamide is obtained as a white solid melting at 124° to 126° C. This acrylamide polymerizes under free radical conditions.

EXAMPLE 2

When the procedure of Example 1 is repeated employing the sodium salts of the perfluoroalkanesulfonamides and the omega haloalkylphthalimides set forth in the following table, the indicated amines are obtained.

TABLE 1

| Sulfonamide | N-haloalkyl of phthalimide | Product amine |
|---|---|---|
| $CF_3SO_2N(CH_3)H$ | $Br(CH_2)_{11}$ | $CF_3SO_2N(CH_3)—(CH_2)_{11}NH_2$ |
| $C_4F_9SO_2N(C_2H_5)H$ | $BrC_2H_4—$ | $C_4F_9SO_2N(C_2H_5)—C_2H_4NH_2$ |
| $C_{12}F_{25}SO_2N(C_2H_5)H$ | $BrC_8H_{16}—$ | $C_{12}F_{25}SO_2N(C_2H_5)—(CH_2)_8—NH_2$ |
| $C_8F_{17}SO_2N(C_6H_{13})H$ | $BrC_2H_4—$ | $C_8F_{17}SO_2N(C_6H_{13})—C_2H_4-NH_2$ |
| $C_{18}F_{37}SO_2N(C_2H_5)H$ | $IC_2H_4—$ | $C_{18}F_{37}SO_2N(C_2H_5)—C_2H_4—NH_2$ |
| $C_8F_{17}SO_2N(C_2H_5)H$ | $ClC_3H_6—$ | $C_8F_{17}SO_2N(C_2H_5)—(CH_2)_3—NH_2$ |

EXAMPLE 3

A shaking autoclave adapted to withstand pressures to 2,000 p.s.i. and fitted with rupture disc is charged with 207 parts (0.284 mole) of N-ethyl perfluorooctanesulfonamidoethyl benzene sulfonate (prepared from the carbinol and benzene sulfonyl chloride and triethylamine in acetone solution), 300 parts by volume of absolute ethanol and 80 parts (4.7 moles) of liquid ammonia and then closed. The temperature is raised while shaking to 120° to 125° C. and maintained for six hours. The autoclave is then cooled and vented. The reaction mixture is worked up by adding an anhydrous ethanolic solution of 0.284 mole of potassium hydroxide and, after stirring for about 10 minutes, the precipitate of potassium benzene sulfonate is collected and the filtrate and washes evaporated under reduced pressure. The crude oily product is taken up in absolute ether (400 parts by volume) and the solution filtered. The product is obtained as an oil boiling at 104° C. at 0.17 mm. Hg pressure by evaporation of the ether and is identical to the product of Example 1. It is converted to the hydrochloride by passing hydrogen chloride into the dry etheral solution.

EXAMPLE 4

When the above procedure is repeated employing sulfonate esters of the N-alkyl perfluoroalkanesulfonamido alkanols shown in the following table, the amines indicated are obtained. The alkanols are available by the procedure of Ahlbrecht and Brown, U.S. Patent 2,803,656, and extension of the procedure thereof to other perfluoroalkane sulfonyl fluorides available by the process of Brice and Trott, U.S. Patent 2,732,298.

Table 2

N-alkylperfluoroalkanesulfonamido alkanol:

$C_8F_{17}SO_2N(C_4H_9)CH_2CH_2OH$
$CF_3SO_2N(CH_3)CH_2CH_2OH$
$C_4F_9SO_2N(C_2H_5)CH_2CH_2OH$
$C_8F_{11}SO_2N(C_2H_5)(CH_2)_6OH$
$C_8F_{17}SO_2N(CH_3)(CH_2)_{11}OH$
$C_{18}F_{37}SO_2N(C_2H_5)(CH_2)_2OH$
$C_8F_{17}SO_2N(C_6H_{13})(CH_2)_2OH$

Product amine:

$C_8F_{17}SO_2N(C_4H_9)CH_2CH_2NH_2$
$CF_3SO_2N(CH_3)CH_2CH_2NH_2$
$C_4F_9SO_2N(C_2H_5)CH_2CH_2NH_2$
$C_8F_{17}SO_2(C_2H_5)(CH_2)_6NH_2$
$C_8F_{17}SO_2N(CH_3)(CH_2)_{11}NH_2$
$C_{18}F_{37}SO_2N(C_2H_5)(CH_2)_2NH_2$
$C_8F_{17}SO_2N(C_6H_{13})C_2H_4NH_2$

EXAMPLE 5

N-methyl perfluorocapramidoethanol, $C_7F_{15}CON(CH_3)C_2H_4OH$ ($n_D^{25}$=1.355; from methyl perfluorocaproate and N-methyl ethanol amine, generally as described in Diesslin et al. U.S. Patent 2,067,011 for amides) is converted to the benzene sulfonate by stirring 23.75 parts in 30 parts of methylene chloride and 5.55 parts of triethylamine at 20° to 25° C. while adding 8.85 parts of benzene sulfonyl chloride. Stirring is continued for 2.5 hours, 60 parts by volume of water at 10° C. are added and, after separation of layers, the organic layer is further washed with water and evaporated to a residue. The product residue is 29.5 parts of the benzene sulfonate ester:

$C_8F_{25}CON(CH_3)C_2H_4OSO_2C_6H_5$

The total ester (29.5 parts) is dissolved in 60 parts of absolute ethanol and 7.5 parts of anhydrous ammonia are introduced. The mixture is heated at 100°–105° C. for 4 hours in a stainless steel autoclave as in Example 3 and then cooled. Sufficient solid potassium hydroxide (3.1 parts, 0.055 mole) is added to the reaction mixture to neutralize the sulfonic acid. The potassium salt precipitates and is collected. The solution is brought to a residue and taken up in acetone to precipitate more of the potassium salt. Evaporation gives $C_8F_{15}CON(CH_3)C_2H_4NH_2$ as a semi-pasty solid at room temperature; $n_D^{30}$=1.375.

The amine is reacted with an epoxy resin to give an oil repellent coating by an essentially conventional method which assures homogeneity of coating.

To a boiling solution of 5 parts of epoxy resin with equivalent weight of 1900 (for example, Epon 1007) in 20 parts of $C_2H_5OC_2H_4OCOCH_3$ is added one part of the above amine (equivalent weight about 640). The solution is boiled for about 10 minutes, adding further solvent as needed, to prereact the fluorinated material with epoxy resin. A portion of the solution is coated on a glass microscope slide and dried at 130° C. for 15 minutes. The coating is colorless, clear and hard. The coating is applied to other surfaces as desired by the same procedure. The contact angle of hexadecane measured against the coating is about 79°. The angle measured against a coating of the epoxy resin cured with conventional non-fluorinated amine is about 0°. This demonstrates the oleophobic character of the coating produced.

This same procedure is used to produce oleophobic coatings from other amines of the invention with similar results.

EXAMPLE 6

When the procedure of Example 5 is repeated using sulfonate esters of other carbonamidoalkanols the corresponding carbonamidoalkylamines are obtained as indicated in the following table.

Carbonamidoalkanol:

$C_3F_7CON(CH_3)C_4H_8OH$
$(CF_3)_2CF(CF_2)_{14}CON(C_3H_7)C_6H_{12}OH$
$C_2F_5(C_6F_{10})C_2F_4CON(CH_3)C_{11}H_{22}OH$
$C_2F_5OC_2F_4CON(C_2H_5)C_2H_4OH$

Product carbonamidoalkyl amine:

$C_3F_7CON(CH_3)C_4H_8NH_2$
$(CF_3)_2CF(CF_2)_{14}CON(C_3H_7)C_6H_{12}NH_2$
$C_2F_5(C_6F_{10})C_2F_4CON(CH_3)C_{11}H_{22}NH_2$
$C_2F_5OC_2F_4CON(C_2H_5)C_2H_4NH_2$

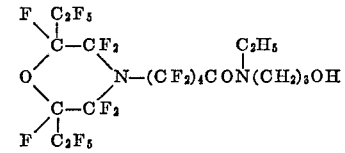

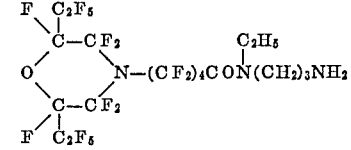

What is claimed is:

1. A perfluoroalkanesulfonamidohydrocarbon amine of the formula

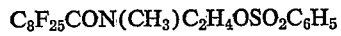
$R_fQ-N-R_2-NH_2$ with $R_1$ above N wherein $R_f$ is saturated perfluoroalkyl of 1 to 18 carbon atoms, $R_1$ is saturated alkyl of 1 to about 6 carbon atoms, $R_2$ is bridging alkylene of 2 to 13 carbon atoms and Q is a member of the group of divalent groups —$SO_2$— and —CO—.

2. N-ethyl-perfluorooctanesulfonamidoethyl amine.

References Cited

UNITED STATES PATENTS

| | | | |
|---|---|---|---|
| 3,207,730 | 9/1965 | Guenthner | 260—79.3 |
| 2,933,382 | 4/1960 | Fowkes et al. | 44—71 |

FOREIGN PATENTS 732,631  4/1966  Canada.

HENRY R. JILES, *Primary Examiner.*

H. I. MOATZ, *Assistant Examiner.*

U.S. Cl. X.R.

106—287; 117—161; 260—247.2, 47, 404.4, 456, 561

PO-1050
(5/69)

UNITED STATES PATENT OFFICE
CERTIFICATE OF CORRECTION

Patent No. 3,450,755            Dated June 17, 1969

Inventor(s) Arthur H. Ahlbrecht

It is certified that error appears in the above-identified patent and that said Letters Patent are hereby corrected as shown below:

Column 1, line 45, "furthe" should read --further--. Column 3, line 71, "$C_8F_{25}$" should read --$C_7F_{15}$--. Column 4, line 7, "$C_8F_{15}$" should read --$C_7F_{15}$--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents